United States Patent
Asprion et al.

(10) Patent No.: US 6,939,393 B2
(45) Date of Patent: Sep. 6, 2005

(54) METHOD FOR NEUTRALIZING A STREAM OF FLUID, AND WASHING LIQUID FOR USE IN ONE SUCH METHOD

(75) Inventors: Norbert Asprion, Mannheim (DE); Christoph Grossmann, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 102 days.

(21) Appl. No.: 10/343,001

(22) PCT Filed: Jul. 24, 2001

(86) PCT No.: PCT/EP01/08554

§ 371 (c)(1),
(2), (4) Date: Jul. 16, 2003

(87) PCT Pub. No.: WO02/07862

PCT Pub. Date: Jan. 31, 2002

(65) Prior Publication Data

US 2004/0036055 A1 Feb. 26, 2004

(30) Foreign Application Priority Data

Jul. 25, 2000 (DE) .......................................... 100 36 173

(51) Int. Cl.$^7$ ............................................... B01D 53/14
(52) U.S. Cl. .......................... 95/236; 423/228; 423/229; 252/189
(58) Field of Search .......................... 95/187, 191, 192, 95/199, 235, 236; 423/220, 228, 229; 250/189

(56) References Cited

U.S. PATENT DOCUMENTS

| 4,336,233 A | 6/1982 | Appl et al. |
| 4,537,753 A | 8/1985 | Wagner et al. |
| 4,551,158 A | 11/1985 | Wagner et al. |
| 4,553,984 A | 11/1985 | Volkamer et al. |
| 4,999,031 A | 3/1991 | Gerhardt et al. |
| 5,277,885 A | 1/1994 | Peytavy et al. |
| 6,290,754 B1 * | 9/2001 | Peytavy et al. ................ 95/172 |
| 6,436,174 B1 * | 8/2002 | Grossmann et al. ........... 95/191 |
| 6,740,230 B1 * | 5/2004 | Hugo et al. .................. 208/237 |

FOREIGN PATENT DOCUMENTS

| CA | 1 290 553 | 10/1991 |
| CA | 1 291 321 | 10/1991 |
| CA | 1 295 810 | 2/1992 |
| EP | 0 160 203 | 11/1985 |
| EP | 0 332 924 | 7/1989 |
| EP | 0 875 280 | 11/1998 |
| GB | 1 058 304 | 2/1967 |
| GB | 1 287 194 | 8/1972 |
| WO | 89/11327 | 11/1989 |
| WO | 99 54024 | 10/1999 |

* cited by examiner

Primary Examiner—Frank M. Lawrence
(74) Attorney, Agent, or Firm—Oblon, Spivak, McClelland, Maier & Neustadt, P.C.

(57) ABSTRACT

A description is given of the use of an alkylenediamine of the type $R_1HN-X-NHR_2$, where X is an alkylene radical having from 2 to 9 carbons, $R_1$ is a hydrocarbon radical having from 1 to 6 carbons and $R_2$ is a hydrocarbon radical having from 1 to 6 carbons or is hydrogen (H) for removing sour gases from a sour-gas-containing fluid stream, and of a process for deacidifying a fluid stream of this type and a wash liquid or absorption liquid for use in such a process. According to the invention, in at least one absorption step, the fluid stream is brought into intimate contact with a wash liquid, the wash liquid comprising an aqueous amine solution which comprises at least one tertiary aliphatic alkanolamine having from 2 to 12 carbons and an activator of the above type $R_1HN-X-NHR_2$. The fluid stream which is substantially freed from sour gases and the sour-gas-loaded wash liquid are then separated from one another.

18 Claims, 5 Drawing Sheets

METHOD FOR NEUTRALIZING A STREAM OF FLUID, AND WASHING LIQUID FOR USE IN ONE SUCH METHOD

BACKGROUND OF THE INVENTION

The present invention relates to a process for deacidifying a fluid stream which comprises sour gases as impurities, and a wash liquid or absorption liquid for use in a process of this type.

In numerous chemical industry processes, fluid streams occur which comprise sour gases, for example $CO_2$, $H_2S$, $SO_2$, $CS_2$, HCN, COS or mercaptans, as impurities. These fluid streams can be, for example, gas streams (such as natural gas, synthesis gas from heavy oil or heavy residues, refinery gas, or reaction gases produced in the partial oxidation of organic materials, for example coal or oil), or liquid or liquefied hydrocarbon streams (such as liquefied petroleum gas (LPG) or natural gas liquid (NGL)).

Before these fluids can be transported or further processed, the sour gas content of the fluid must be significantly reduced. $CO_2$, for example, must be removed from natural gas, since a high $CO_2$ concentration reduces the heating value of the gas. In addition, $CO_2$, together with water which is frequently entrained in the fluid streams, can lead to corrosion on pipes and fittings.

Removing sulfur compounds from these fluid streams is of special importance for a number of different reasons. For example, the sulfur compound content of natural gas must be reduced directly at the natural gas source by suitable treatment measures, since the sulfur compounds, in the water which is frequently entrained by the natural gas, form acids which have a corrosive action. To transport natural gas in a pipeline, therefore preset limits of the sulfur compound impurities must be complied with. Furthermore, numerous sulfur compounds are, even at low concentrations, foul-smelling and, especially hydrogen sulfide ($H_2S$), toxic.

Therefore, numerous processes have previously been developed for removing sour gas constituents from fluid streams such as hydrocarbon gases, LPG or NGL. In the most widespread processes, the sour gas-containing fluid mixture is brought into contact with an organic solvent or an aqueous solution of an organic solvent in a gas scrubber or liquid/liquid extraction step.

Gas scrubbing processes and corresponding scrubbing solutions used in these processes are also covered by extensive patent literature. In principle, a distinction can be made between two different types of absorbants or solvents for gas scrubbing:

Firstly, physical solvents are used, in which, after absorption has been completed, the dissolved sour gases are present in molecular form. Typical physical solvents are cyclotetramethylene sulfone (sulfolane) and its derivatives, aliphatic acid amides, NMP (N-methylpyrrolidone), N-alkylated pyrrolidones and corresponding piperidones, methanol and mixtures of dialkyl ethers of polyethylene glycols (Selexol®, Union Carbide, Danbury, Conn., USA).

Secondly, chemical solvents are used whose mode of action is based on chemical reactions in which, after absorption is completed, the dissolved sour gases are present in the form of chemical compounds. For example, in the case of the aqueous solutions of inorganic bases (for example potash solution in the Benfield process) or organic bases (for example alkanolamines) used as chemical solvents most frequently on an industrial scale, salts are formed when sour gases are dissolved. The solvent can be regenerated by heating or stripping, the sour gas salts being thermally decomposed and/or stripped off by steam. After the regeneration process the solvent can be reused. Preferred alkanolamines used in the removal of sour gas impurities from hydrocarbon gas streams include monoethanolamine (MEA), diethanolamine (DEA), triethanolamine (TEA), diisopropylamine (DIPA), aminoethoxyethanol (AEE) and methyldiethanolamine (MDEA).

Primary and secondary alkanolamines are suitable in particular for gas scrubbers in which the purified gas must have a very low $CO_2$ content (for example 10 $ppm_v$, $CO_2$). The nitrogen of the primary and secondary alkanolamines reacts directly with carbon dioxide, forming soluble carbamate. In the aqueous amine solution the carbamate is in a characteristic equilibrium with bicarbonate. To regenerate the amine solution, in industrial use, a two-stage regeneration process is frequently used, the loaded solvent firstly being expanded in one or more flash columns so that some of the absorbed $CO_2$ vaporizes from the solution. Residual carbon dioxide and, if appropriate, other absorbed sour gases are then removed by stripping with steam. Solvents which comprise primary and secondary alkanolamines, however, require a greater amount of steam to decompose the carbamate than tertiary amines and correspondingly a great deal of heat energy; therefore, tertiary amines are frequently used.

European patent application EP-A 0 322 924 discloses using an aqueous amine solution which comprises tertiary alkanolamines, in particular MDEA, for deacidifying gas streams. In contrast to primary and secondary alkanolamines, tertiary alkanolamines do not react directly with carbon dioxide, since the amine is completely substituted. Rather, carbon dioxide is reacted with the tertiary alkanolamine and water to form bicarbonate in a reaction having a low reaction rate. Since no direct bond is formed between tertiary alkanolamines and carbon dioxide, the amine solution can be economically regenerated. In many cases, flash regeneration involving one or more expansion steps is sufficient here. An optional additional thermal regeneration requires significantly less energy than in the case of solutions of primary or secondary alkanolamines. Tertiary amines are suitable, in particular, for selective removal of $H_2S$ from gas mixtures which comprise $H_2S$ and $CO_2$.

However, a disadvantage of the use of tertiary alkanolamine solutions is that, because of the low reaction rate of the carbon dioxide, the scrubbing process must be carried out with a very high residence time. The absorption and regeneration columns required are therefore very high, compared with systems in which either primary or secondary alkanolamines are used. Attempts have therefore been made to increase the absorption rate of carbon dioxide in aqueous solutions of tertiary alkanolamines by adding other compounds which are called activators or promoters.

German patent application DE-A-1 542 415 proposed increasing the activity both of physical solvents and of chemical solvents by adding monoalkylalkanolamines or morpholine and its derivatives. EP-A-0 160 203 mentions monoethanolamine as activator. German patent application DE-A-1 904 428 describes the addition of monomethylethanolamine (MMEA) as an accelerator to improve the absorption properties of an MDEA solution.

U.S. Pat. No. 4,336,233 describes one of the currently most effective scrubbing liquids for removing $CO_2$ and $H_2S$ from a gas stream. This is an aqueous solution of methyldiethanolamine (MDEA) and piperazine as absorption accelerator or activator (aMDEA®, BASF AG, Ludwigshafen). The scrubbing liquid described there comprises from 1.5 to 4.5 mol/l of methyldiethanolamine (MDEA) and 0.05 to 0.8 mol/l, preferably up to 0.4 mol/l, of piperazine. Removal of $CO_2$ and $H_2S$ with the use of MDEA is further described in more detail in the following patents of the applicant: U.S. Pat. Nos. 4,551,158; 4,553,984; 4,537,753; 4,999,031; CA 1 291 321 and CA 1 295 810.

International patent application WO 89/11327 discloses an absorption or scrubbing liquid which consists of an aqueous amine solution which comprises tertiary amines and small amounts of polyamines, for example aliphatic diamines as activator.

SUMMARY OF THE INVENTION

It is an object of the present invention to specify an improved process for deacidifying a fluid stream which comprises sour gases as impurities by gas scrubbing, sour gases such as $CO_2$, $H_2S$, COS, $CS_2$ or mercaptans being able to be removed effectively from the fluid stream and the absorption kinetics of $CO_2$ and loadability of the scrubbing liquid with $CO_2$ being improved compared with the known processes.

We have found that this object is achieved by the process according to the present invention.

The present invention therefore relates to a process for deacidifying a fluid stream which comprises sour gases, such as $CO_2$, $H_2S$, COS, $CS_2$ or mercaptans, as impurities, which comprises bringing the fluid stream, in at least one absorption step, into intimate contact with a wash liquid which comprises an aqueous amine solution which comprises at least one tertiary aliphatic alkanolamine having from 2 to 12 carbons and an activator of the type $R_1HN$—X—$NHR_2$, where X is an alkylene radical having from 2 to 9 carbons, $R_1$ is a hydrocarbon radical having from 1 to 6 carbons and $R_2$ is a hydrocarbon radical having from 1 to 6 carbons or is a hydrogen. The sour gases are removed from the fluid stream and absorbed by the wash liquid. The fluid stream which is substantially free from sour gases and the sour-gas-loaded wash liquid are then separated from one another. Surprisingly it has been found that when an alkylenediamine of the abovedescribed type is used as activator, the load-bearing capacity of the wash liquid is significantly increased compared with known wash liquids. The inventively proposed alkylenediamines exhibit significantly better absorption kinetics for $CO_2$ then the primary or secondary alkanolamines customarily used as activators. Preferably, $R_1$ is a methyl radical and $R_2$ is hydrogen (3-methylaminopropylamine) or also a methyl radical (N,N'-dimethylaminopropylamine). Particularly preferably, 3-methylaminopropylamine (MAPA) is used as activator. The absorption kinetics are comparable with those of the activator piperazine, 3-methylaminopropylamine, compared with piperazine, however, exhibiting significantly better solubility in tertiary alkanolamines. Therefore, wash liquids having significantly higher activator concentration can be used.

DETAILED DESCRIPTION OF THE PREFERRED EMBODIMENTS

The present invention, therefore in the most general form, relates to the use of an alkylenediamine of the type $R_1HN$—X—$NHR_2$, where X is an alkylene radical having from 2 to 9 carbons, $R_1$ is a hydrocarbon radical having from 1 to 6 carbons and $R_2$ is a hydrocarbon radical having from 1 to 6 carbons or is a hydrogen (H), for removing sour gases from a sour-gas-containing fluid stream, in particular the use of MAPA as activator in an aqueous tertiary alkanolamine-containing wash liquid.

The present invention also relates to an absorption liquid or wash liquid which is suitable in particular for use in the inventive process, which liquid comprises an aqueous amine solution which in turn comprises at least one tertiary aliphatic alkanolamine having from 2 to 12 carbons and an alkylenediamine of the type $R_1HN$—X—$NHR_2$ as activator, where X is an alkylenediamine radical having from 2 to 9 carbons, $R_1$ is a hydrocarbon radical having from 1 to 6 carbons and $R_2$ is a hydrocarbon radical having from 1 to 6 carbons or is a hydrogen.

Preferably, X is an alkylene radical having 2 or 3 carbons and $R_1$ is a hydrocarbon radical having 1 or 2 carbons. $R_2$ is preferably a hydrocarbon radical having 1 or 2 carbons, or hydrogen.

The concentration of the tertiary aliphatic alkanolamine is advantageously from 10 to 60% by weight. Preferably, the alkanolamine concentration is from 20 to 50% by weight, and particularly preferably from 20 to 40% by weight. The concentration of the activator is advantageously from 0.1 to 50% by weight, preferably from 5 to 40% by weight, and particularly preferably from 8 to 30% by weight. These figures relate to the ready-to-use wash liquid. The inventive wash liquid is usually prepared as concentrate which is diluted by the user to the final concentration by adding water.

The tertiary alkanolamine can be customary alkanolamines which have proven themselves in gas scrubbing or LPG washing, as are described, for example, in WO 89/11327. However, particularly preferably triethanolamine (TEA) and methyldiethanolamine (MDEA) are used. The use of MDEA is preferred in particular for amine scrubbing of hydrocarbon gases, such as natural gas, while the use of TEA can be advantageous in LPG washing. Thus, for example, U.S. Pat. No. 5,877,386 describes that TEA-containing amine solutions have a lower solubility in LPG, which decreases the amine losses in the washing process.

Advantageously, the wash liquid can in addition comprise piperazine or methylpiperazine as additional activators, the concentration of the additional activators being from 1 to 20% by weight, preferably from 1 to 10% by weight, and particularly preferably from 1 to 8% by weight. The inventive wash liquid can be an aqueous amine solution which, as described, for example, in U.S. Pat. No. 4,336,233, comprises a tertiary aliphatic alkanolamine, in particular MDEA, and piperazine, as first activator (that is to say, for example, aMDEA®, the absorption medium prepared and distributed by BASF AG, Ludwigshafen, Germany). According to the invention it is proposed to add an alkylenediamine such as MAPA as second activator. Surprisingly, in the case of wash liquids having the same total amine content, it is found that replacing water by MAPA, compared with replacing water by MDEA, leads to accelerated absorption kinetics and to an up to 80% higher load-bearing-capacity of $CO_2$.

The inventive wash liquid may also comprise small amounts of a physical absorbant or solvent for sour gases, for example sulfolane, aliphatic acid amides, N-methylpyrolidone or methanol.

The inventive wash solution also permits substantial removal of $H_2S$ from the gas stream. COS and mercaptans can also at least partially be removed.

The inventive process can be carried out using the customary wash apparatuses used in gas scrubbing or LPG washing. Suitable wash apparatuses which ensure, in an absorption zone, intimate contact between the fluid stream and the wash liquid are, for example, packed columns containing loose or arranged packings, plate columns, radial stream scrubbers, jet scrubbers, venturi scrubbers and rotary spray scrubbers, preferably packed columns containing arranged packings or loose packings and plate columns.

In the absorption column, the wash liquid typically has a temperature from 40 to 70° C. of the column top and from 50 to 100° C. of the column bottom. The total pressure in the column is generally from 1 to 120 bar, preferably from 10 to 100 bar.

The inventive process can be carried out in one step or in a plurality of sequential partial steps. In the latter case, the sour gas constituent-containing fluid stream is brought into intimate contact in each partial step in each case with a substream of the wash liquid. For example, at different points of the absorption zone a substream of the absorption medium can be fed, in which case, for instance when an absorption column is used, the temperature of the wash liquid fed decreases in sequential partial steps generally from bottom to top of the column.

The wash liquid loaded with sour gas constituents and the purified gas are separated from one another and removed from the absorption zone. The wash liquid can then be regenerated and then recirculated to the absorption zone with decreased loading. Typically, during the regeneration, the loaded wash liquid can be pressure expanded from a high pressure prevailing in the absorption zone to a lower pressure. The pressure expansion can be carried out, for example, using a throttle valve. Additionally, or alternatively, the wash liquid can be passed through an expansion turbine which can drive a generator and produce electrical energy. The energy thus removed from the wash liquid during expansion may also be used, for example, to drive liquid pumps in the wash liquid circuit.

The sour gas constituents can be released during the regeneration of the wash liquid, for example, in an expansion column, for example a vertically or horizontally installed flash vessel or a countercurrent flow column containing internals. A plurality of expansion columns can be connected in series, in which regeneration is carried out at different pressures. For example, the wash liquid can be regenerated firstly in a pre-expansion column at high pressure which is, for example, approximately 1.5 bar above the partial pressure of the sour gas constituents in the absorption zone, and then in a main expansion column at low pressure, for example at from 1 to 2 bar absolute. In a multistage expansion process, in the first expansion column preferably inert gases are released, such as absorbed components of the gas to be purified, and in the subsequent expansion columns the sour gas constituents are released.

Using a stripping step which is preferably also provided, with an inert fluid, further sour gases can be removed from the wash liquid during the regeneration. For this purpose the wash liquid and a stripping medium, advantageously a hot inert gas, nitrogen or steam being preferred, being passed in countercurrent through a desorption column provided with loose packings, arranged packings or plates. Preferably, the pressure during stripping is from 1 to 3 bar absolute and the temperature from 90 to 130° C.

Regeneration of the wash liquid and a plurality of sequential partial steps, the loading of the wash liquid with sour gas constituents decreasing with each partial step, is described, for example, in U.S. Pat. No. 4,336,233. According to this, a coarse scrubbing is carried out with a pure expansion circuit without stripping, the loaded wash liquid being expanded via an expansion turbine and regenerated stepwise in a pre-expansion column and a main expansion column. This variant is used, especially, when the sour gas constituents to be washed out have high partial pressure and when only modest requirements are made of the clean gas purity.

In a further preferred embodiment of the inventive process, the substreams of the wash liquid which are used in sequential partial steps of the washing operation or absorption operation can be obtained by sequential partial steps of the regeneration operation and have a decreased loading with sour gas constituents. In particular, a process is preferred in which the sour gas constituent-containing feed gas or LPG is sequentially brought into intimate contact with a first substream of the wash liquid which is obtained after partial regeneration in an expansion column and before the stripping, and a second partial stream of the wash liquid which is obtained after the stripping.

For example, as described in U.S. Pat. No. 4,336,233, the absorption step can be carried out in two partial steps, a coarse scrubbing and a fine scrubbing, and the regeneration step can be carried out stepwise by pressure expansion in an expansion turbine, a pre-expansion column and a main expansion column, and by subsequent stripping. In this case the substream of the wash liquid for the coarse scrubbing can originate from the main expansion column and the substream for the fine scrubbing can originate from the stripping.

The regenerated absorption medium is usually, before being fed into the absorption zone, passed through a heat exchanger and brought to the temperature required for the washing apparatus. For example, heat can be removed from the regenerated wash liquid leaving the stripping column and fed to the wash liquid which still comprises sour-gas constituents before its entry into the stripping column.

The inventive process can be carried out with typical plant configurations used for gas scrubbing and subsequent regeneration of the wash liquid, as are described, for example, in U.S. Pat. No. 4,336,233 for a single-stage wash process or two-stage wash process and are described particularly extensively in EP-A 0 322 924 for a single-stage washing process with expansion and stripping steps. Both documents are hereby expressly incorporated by reference.

The inventive process is described in more detail below with reference to the accompanying drawing.

In the drawing

Figure 1:
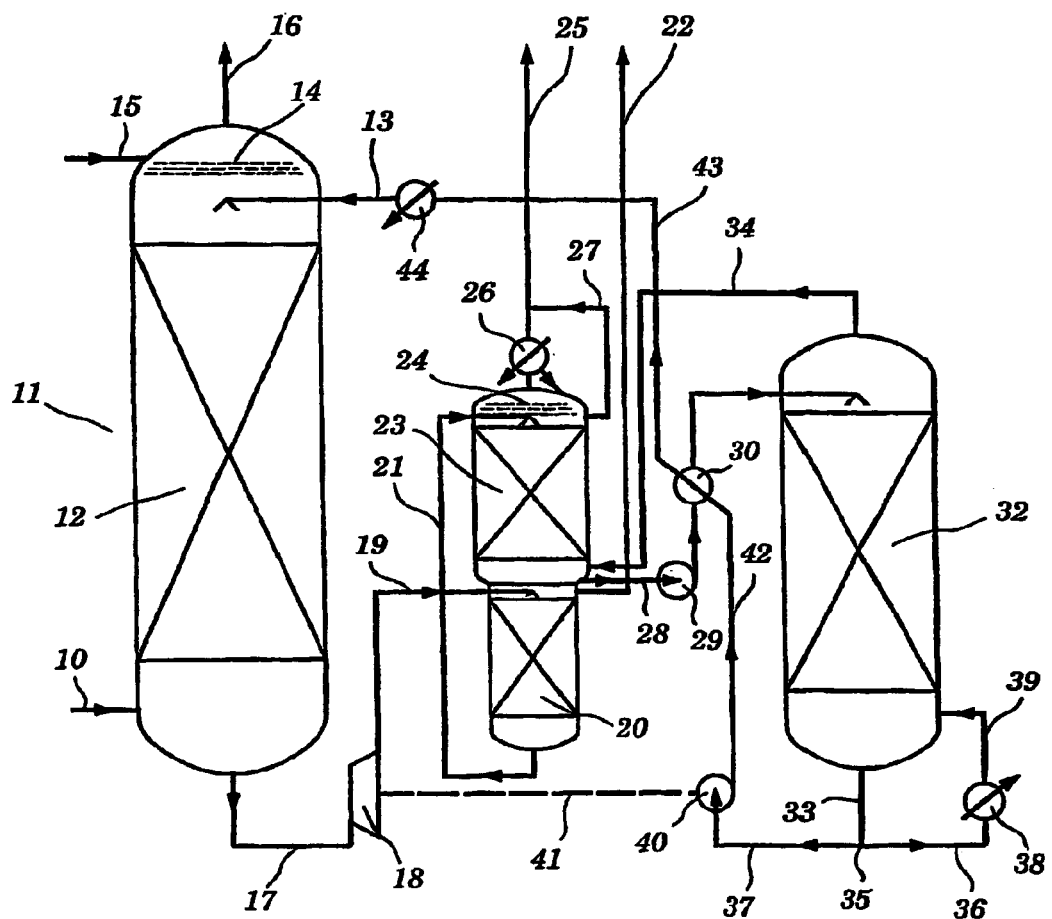
FIG. 1 shows a diagrammatic representation of a plant for carrying out the inventive process in a single-stage washing process, which is followed by regeneration of the wash liquid with expansion and stripping columns.

With reference to FIG. 1, a preferred arrangement is shown for carrying out the inventive process, as used, for example, for removing sour gases from a natural gas stream containing $CO_2$ and other acid gases.

The fluid mixture which can comprise, for example, natural gas as product of value and, in addition, sour gases such as $H_2S$, $CO_2$ and COS, is passed via a feed line 10 into an absorption column 11. Before entry into the absorption column, separation devices (which are now shown) can be provided, which remove, for example, liquid droplets from the crude gas. The absorption column 11 has an absorption zone 12 in which intimate contact of the sour crude gas with a low-sour-gas wash liquid is ensured, which liquid passes via a feed line 13 into the top region of the absorption column 11 and is passed in countercurrent to the gas to be treated. The absorption region 12 can be implemented, for example, by plates, for instance sieve plates or bubble-cap plates, or by packings. Typically, 20 to 34 plates are used. In the top region of the absorption column 11, backwash plates 14 can be disposed, in order to decrease the loss of readily volatile constituents of the wash liquid. The backwash plates 14, which are designed, for example, as bubble-cap plates, are fed via a condensate line 15 with water through which the treated gas is passed.

The natural gas stream which is substantially freed from sour gas constituents leaves the absorption column 11 via a top takeoff 16. In the line 16, in particular when no backwash plates are provided in the column 11, a separator (which is not shown) can be disposed which removes entrained wash liquid from the gas stream.

Figure 2:
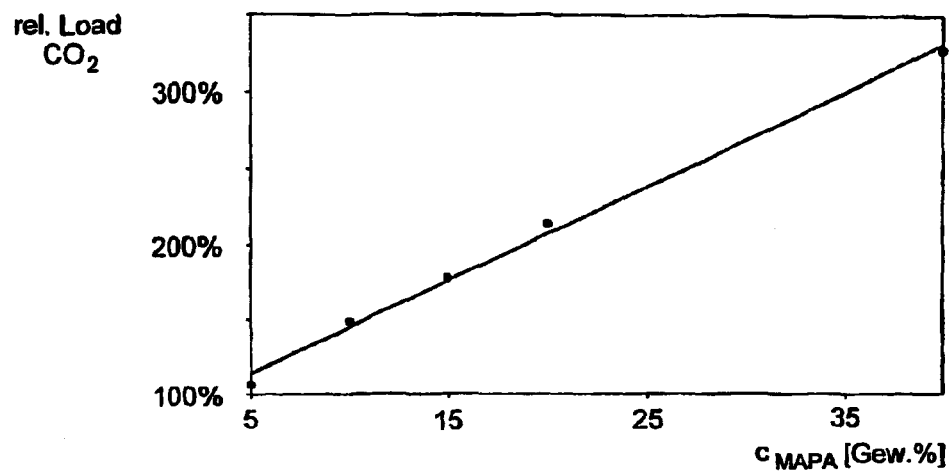
FIG. 2 shows a diagram of the relative $CO_2$ equilibrium loading of an inventive wash liquid relative to a comparison wash liquid as a function of the activator concentration.

Instead of the single-stage absorption device described here, a two-stage variant can also be used, as shown, for example, in FIG. 2 of U.S. Pat. No. 4,336,233.

The sour-gas-containing wash liquid leaves the absorption column 11 via a line 17 and passes via an optionally present expansion turbine 18 and a line 19 into the top region of a first expansion column 20. In the expansion column 20, the pressure of the wash liquid is suddenly reduced, so that the lighter components of the gas to be purified can evaporate from the wash liquid. These components can be burnt or recirculated to absorption column 11. The wash liquid leaves the first expansion column 20 via a line 21 at the bottom of the column, while the vaporized components of the gas to be purified are removed via a line 22 at the top of the expansion column 20.

In the example shown, the wash liquid then passes into a second expansion column 23 which can be designed, for example, as a low-pressure column (that is to say as a low-pressure flash column). Less volatile sour gases, after passage through optionally provided backwash plates 24, evaporate off via line 25. At the top of the second expansion column 23 a heat exchanger with top distributor or condenser 26 can be provided, which heat exchanger recirculates the entrained wash liquid droplets to the expansion column. The condenser 26 may be bridged by a bypass line 27. The wash liquid leaves the second expansion column 23 via a line 28 and is pumped via a pump 29 through a heat exchanger 30 where it takes up heat from the regenerated wash liquid recirculated to the absorption column 11. The wash liquid then passes into the top region of a stripping column 32 in which the wash liquid is conducted in countercurrent to a gas stream, for example steam. In the stripping column 32 residual sour gas constituents are removed from the wash liquid. The wash liquid leaves the bottom region of the stripping column 32 via a line 33, while the sour gas constituents which have been stripped off are recirculated via a line 34 to the bottom region of the expansion column 23. The wash liquid flowing off via the line 33 passes to a distributor 35 at which a part of the wash liquid is transported via a line 36 to a reboiler 38 which heats the liquid and recirculates it into the stripping tube as vapor via a line 39. Another part of the wash liquid passes from the distributor 35 via the line 37 to a pump 40 which, as indicated diagrammatically by the transfer path 41, is connected to the expansion turbine 18. The expansion turbine delivers a part of the energy required to drive the pump 40. Via line 42 the regenerated low-sour-gas wash liquid passes into the heat exchanger 30, where it transfers heat to the wash liquid passed through the line 28 into the stripping column 32. The regenerated wash liquid is then recirculated via the lines 43 and 13 to the absorption column 11, where it can again absorb sour gases. Before entry into the absorption column, a further heat exchanger 44 can be provided, which cools the wash liquid to the required inlet temperature. Filters and other purification devices (which are not shown) can also be provided, in order to purify the wash liquid before its entry into the absorption column 11.

In the region of the lines 43, 13, feed lines (which are not shown) for fresh wash liquid can also be provided, if the inlet rate required cannot be maintained solely by regenerated wash liquid.

The amount of influent wash liquid can be regulated via the pump output and by valve and throttling devices (which are not shown).

Advantages of the invention are described in more detail below with reference to examples.

EXAMPLES

1. $CO_2$ Equilibrium Loading

To measure the equilibrium loading, 100 ml of wash liquid are treated with gaseous $CO_2$ at a flow rate of 10 liters (at stp) per hour over a period of 4 hours in a thermostated fritted flask (250 ml) at 70° C. and 1 bar. The stripped water was recondensed in a spiral cooler. The $CO_2$ concentration in the solution was then determined by analysis and the equilibrium loading was calculated from this in liters of gas (at stp) per kilogram of wash liquid (l(stp)/kg).

(1a) In FIG. 2 the relative $CO_2$ equilibrium loading (indicated as "rel. load $CO_2$" in the figure) of an inventive wash liquid having a total amine content of 40% by weight, which comprises 3-methylaminopropylamine (MAPA) dissolved in a mixture of MDEA and 60% by weight of water, shown compared with the $CO_2$ equilibrium loading of a comparison wash liquid which comprises 5% by weight of piperazine, 35% by weight of MDEA and 60% by weight of water, as a function of the MAPA content (in % by weight). The inventive wash liquid, in the total range, shows a higher load-bearing capacity with $CO_2$, which, at the highest shown MAPA concentration, exceeds three times the value of the comparison wash liquid.

Figure 3:
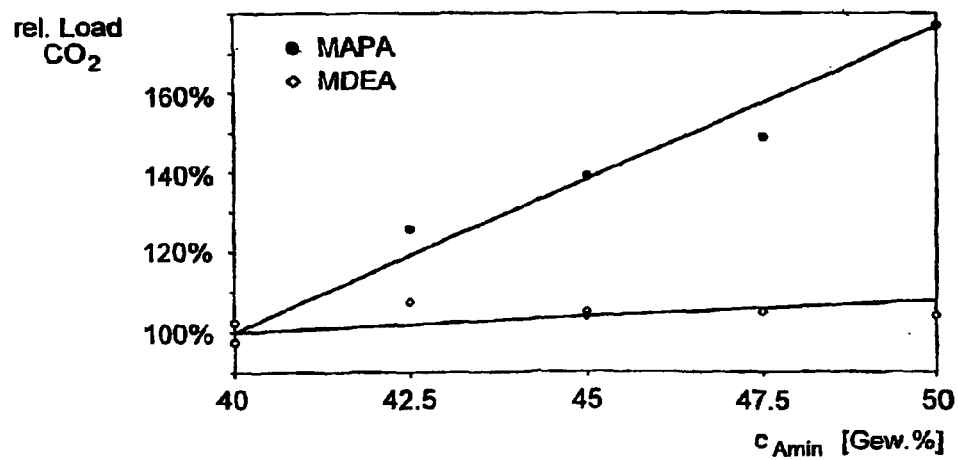
FIG. 3 shows a diagram of the relative $CO_2$ equilibrium loading of an inventive wash liquid relative to a comparison wash liquid as a function of the total amine content.

(1b) In a further experiment (FIG. 3), the $CO_2$ equilibrium loading of a wash liquid was studied as a function of the total amine content (in % by weight). The base wash liquid had the following composition: 60% by weight of water, 33.5% by weight of MDEA and 6.5% by weight of piperazine (that is to say 40% by weight of total amine content). In two test series, wash liquids were studied whose total amine content, starting from the composition of the base wash liquid, was increased by replacing water by MAPA (inventive wash liquid) or by replacing water by MDEA (comparison wash liquid). FIG. 3 shows the relative $CO_2$ equilibrium loading of these wash liquids compared with the $CO_2$ equilibrium loading of the base wash liquid. In FIG. 3, circles show the MAPA data and lozenges the MDEA measurements. It can be seen that the inventive wash liquid (circles) has a higher load bearing capacity for $CO_2$ over the entire range than the base wash liquid. By increasing the MAPA content to 10% by weight (dissolved in a mixture of 6.5% by weight of piperazine, 33.5% by weight of MDEA and water; this corresponds to a total amine content of 50% by weight), the load bearing capacity for $CO_2$ can be roughly doubled under the conditions selected. Increasing the MDEA content of the comparison liquid (lozenges in FIG. 3) by 10% by weight of to a total amine content of 50% by weight, in contrast, brings no marked improvement in $CO_2$ load bearing capacity.

2. $H_2S$ Equilibrium Loading

The $H_2S$ equilibrium loading was determined in a similar manner to that of $CO_2$ according to example 1.

Figure 4:
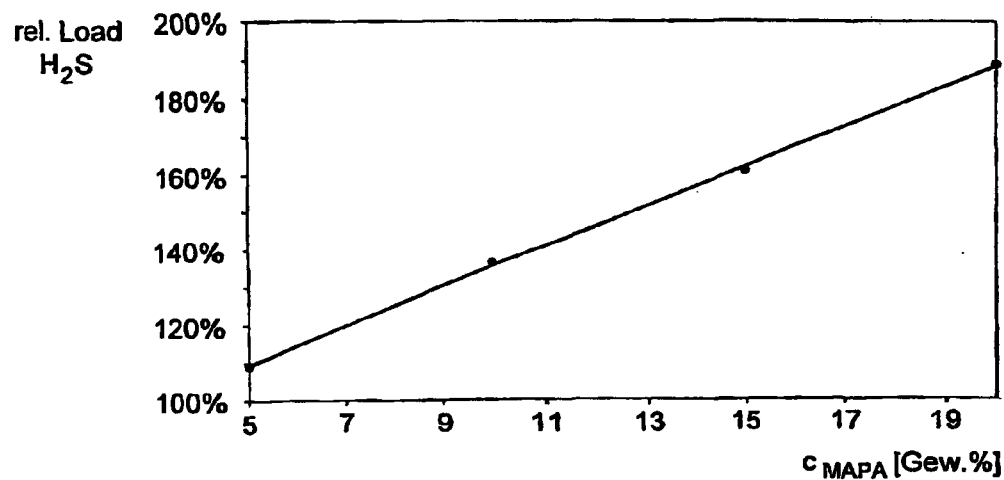
FIG. 4 shows a diagram of the relative $H_2S$ equilibrium loading of an inventive wash liquid compared with a comparison wash liquid as a function of the activator concentration.

FIG. 4 shows the relative $H_2S$ equilibrium loading ("rel. load $H_2S$") of an inventive wash liquid having 40% by weight total amine content, which comprises MAPA dissolved in a mixture of MDEA and 60% by weight of water, compared with the $CO_2$ equilibrium loading of a comparison wash liquid which comprises 5% by weight of piperazine, 35% by weight of MDEA and 60% by weight of water, as a function of MAPA content. The inventive wash liquid has a higher load-bearing capacity for $H_2S$ over the entire range, which reaches roughly twice the value of the comparison example at the highest MAPA concentration given.

3. $CO_2$ Mass Transfer Rate

The mass transfer rate was determined in a laminar flow chamber using water-vapor-saturated sour gas at 1 bar and 70° C., jet diameter 0.94 mm, jet length from 1 to 8 cm, wash liquid flow rate 1.8 ml/s and is reported as gas volume in cubic meters (at stp) per unit surface area of wash liquid, pressure and time ($m^3$(stp)/$m^2$/bar/h).

Figure 5:
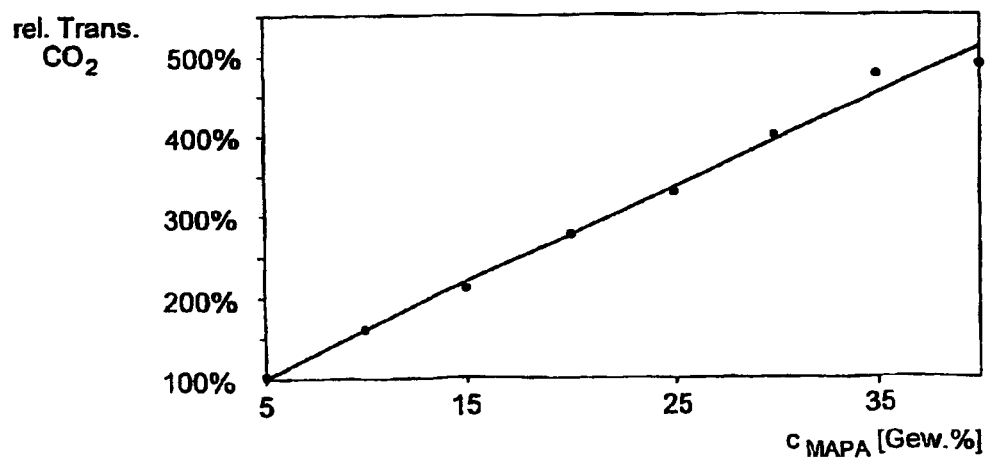
FIG. 5 shows a diagram of the relative mass transfer rate of $CO_2$ of an inventive wash liquid compared with a comparison wash liquid as a function of the activator concentration.

(3a) FIG. 5 shows the relative mass transfer rate of $CO_2$ ("rel. trans. $CO_2$") in the wash liquid defined above (example 1a; FIG. 2) as a function of MAPA content. Above 5% by weight, the inventive wash liquid, with increasing MAPA concentration, shows greatly increasing mass transfer rates relative to the comparison wash liquid which are higher by a factor of 5 than the comparison example at the highest concentration given.

Figure 6:
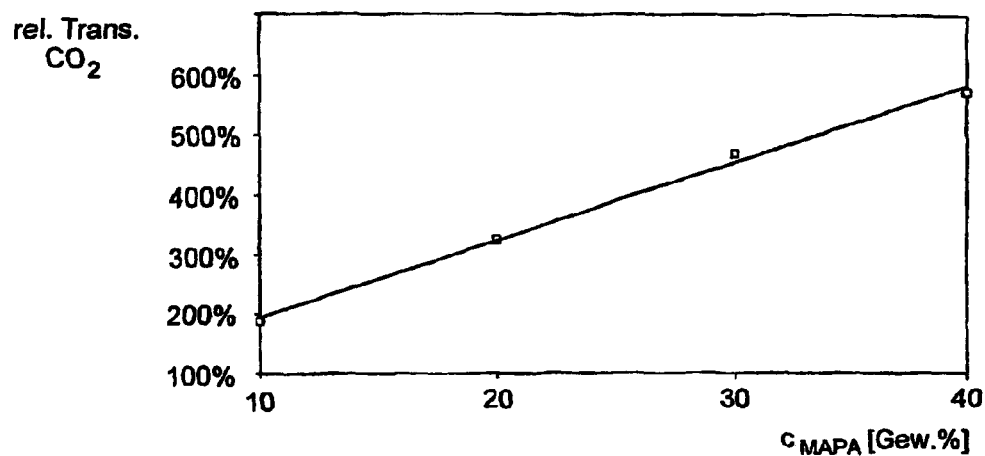
FIG. 6 shows a diagram corresponding to the diagram of FIG. 5 with a different comparison wash liquid being used.

(3b) In a further experiment, the relative $CO_2$ mass transfer rate of an inventive wash liquid having 40% by weight total amine content (MAPA dissolved in a mixture of MDEA and 60% by weight of water) is determined in comparison with the mass transfer rate of a comparison wash liquid which comprises 10% by weight of 3-(N,N)-dimethylaminopropylamine, 30% by weight of MDEA and 60% by weight of water, as a function of MAPA content. The comparison wash liquid activator is also, therefore, an alkylenediamine, but not according to the invention. The result is shown in FIG. 6. Over the total range, the inventive wash liquid, with increasing MAPA concentration, shows greatly increasing mass transfer rates relative to the comparison wash liquid, which are higher by a factor of 5 than those of the comparison wash liquid at the highest given concentration. The inventive wash liquid therefore requires for effective $CO_2$ removal from the gas stream lower contact times, so that shorter absorption columns can be used.

4. Wash Liquid Solidification Temperature

The solidification temperature was determined in compliance with the ASTM method D 2386-67 (according to DIN 51421), by cooling the corresponding liquid with stirring with a low temperature gradient. The solubility temperature was determined by observing the first crystal formation, recognizable by solution turbidity.

Figure 7:
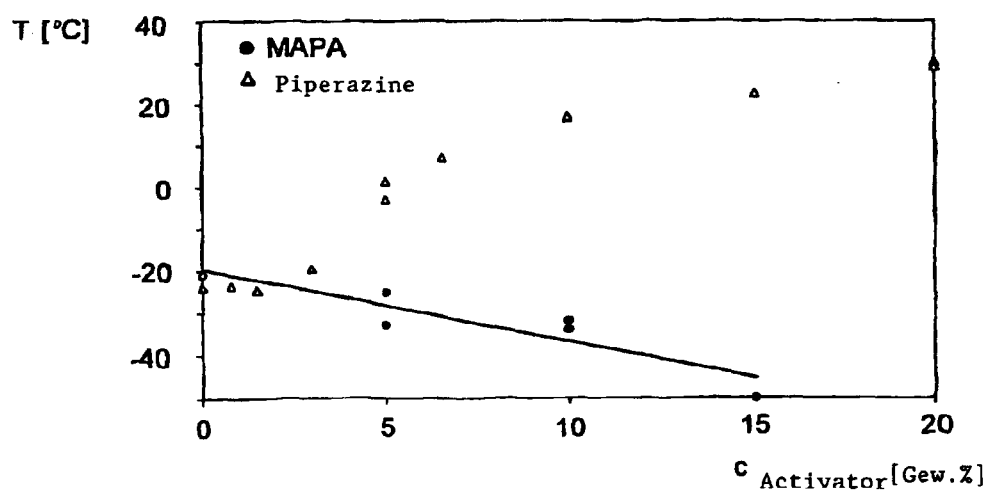
FIG. 7 shows a diagram which gives the solidification points of an inventive wash liquid and a comparison wash liquid as a function of the activator concentration.

(4a) FIG. 7 shows the temperature/concentration course of the solidification points of a wash liquid having 40% by weight total amine content which comprises MDEA and 60% by weight of water as a function of the activator concentration. In the inventive wash liquids MAPA is added as activator (circles in the diagram of FIG. 7). In comparison experiments, piperazine is added as activator (triangles in the diagram of FIG. 7). It is shown that in the inventive wash liquid, from an activator concentration of 5% by weight, the solidification temperature is about 20 Kelvin lower than that of the comparison wash liquid.

Figure 8:
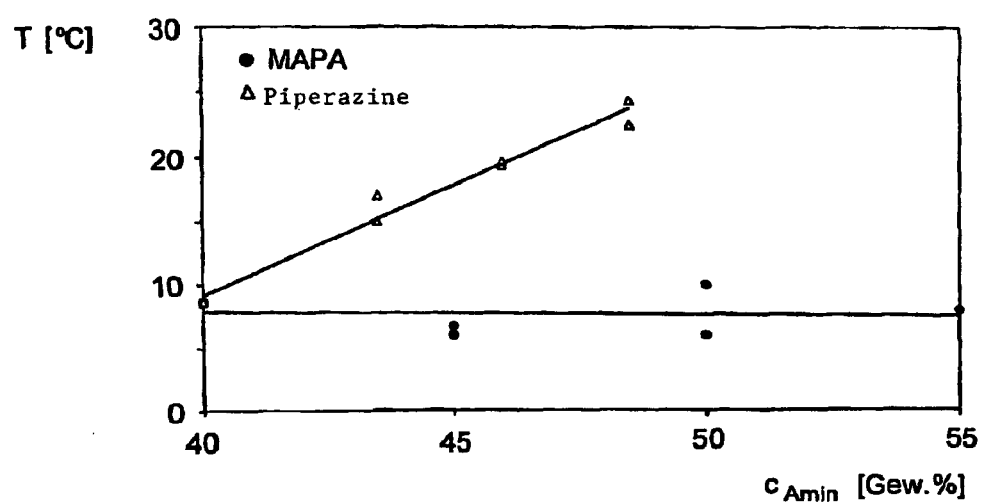
FIG. 8 shows a diagram which gives the solidification points of a piperazine-containing wash liquid with addition of an inventive activator and with addition of further piperazine.

(4b) In a further experiment, the temperature/concentration course of the solidification points of a wash liquid was studied as a function of total amine content. The base wash liquid had the following composition: 60% by weight of water, 33.5% by weight of MDEA and 6.5% by weight of piperazine (that is to say 40% by weight total amine content). In two test series, wash liquids were studied whose total amine content, starting from the composition of the base wash liquid, was increased by replacing water by MAPA (inventive wash liquid) or by replacing water by piperazine (comparison wash liquid). The result is shown in the diagram of FIG. 8. The solidification points of the inventive wash liquid (MAPA addition) are represented there by circular symbols and those of the comparison wash liquid (piperazine addition) by triangular symbols. At the same total amine content, the wash liquid containing 3-methylaminopropylamine as activator has a significantly lower solidification temperature.

We claim:

1. A process for deacidifying a fluid stream which comprises sour gases as impurities, comprising contacting the fluid stream,
   in at least one absorption step, with a wash liquid which comprises an aqueous amine solution which comprises at least one tertiary aliphatic alkanolamine having from 2 to 12 carbons and an activator comprising

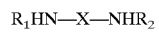

where X is an alkylene radical having from 2 or 3 carbons, $R_1$ is a methyl radical and $R_2$ is a methyl radical or is a hydrogen,
   and separating the fluid stream which is substantially freed from sour gases and a sour-gas-loaded wash liquid.

2. A process as claimed in claim 1, wherein the activator is 3-methylaminopropylamine.

3. The process as claimed in claim 1, wherein the wash liquid is then regenerated and then again fed to the absorption or extraction zone.

4. The process as claimed in claim 3, wherein the wash liquid is regenerated by a single- or multistage expansion.

5. The process as claimed in claim 4, wherein the wash liquid, after the expansion, is regenerated by stripping with an inert fluid.

6. The process as claimed in claim 1, wherein the at least one absorption step is carried out in a plurality of sequential part steps, the sour-gas-containing fluid stream being brought into contact in each of the part steps, in each case with a substream of the wash liquid.

7. The process as claimed in claim 6, wherein the substream of the wash liquid is produced after respective sequential part steps of the wash liquid regeneration process, so that the substreams of the wash liquid have a decreasing sour gas loading.

8. A wash liquid, comprising an aqueous amine solution which comprises at least one tertiary aliphatic alkanolamine having from 2 to 12 carbons and an activator of the form

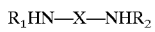

where X is an alkylene radical having from 2 or 3 carbons, $R_1$ is a methyl radical and $R_2$ is a methyl radical or is hydrogen.

9. A process as claimed in claim 8, wherein the activator is 3-methylaminopropylamine.

10. The wash liquid as claimed in claim 8, wherein the at least one tertiary aliphatic alkanolamine concentration is from 10 to 60% by weight and the activator concentration is from 0.1 to 50% by weight.

11. A The wash liquid as claimed in claim 8, wherein the at least one tertiary aliphatic alkanolamine is methyldiethanolamine or triethanolamine.

12. The wash liquid as claimed in claim 8, which further comprises piperazine or methylpiperazine.

13. The process as claimed in claim 1, wherein the wash liquid further comprises piperazine or methylpiperazine.

14. The process as claimed in claim 5, wherein the inert fluid is nitrogen or steam.

15. The wash liquid as claimed in claim 10, wherein the at least one tertiary aliphatic alkanolamine concentration is from 20 to 50%.

16. The wash Liquid as claimed in claim 10, wherein the at least one tertiary aliphatic alkanolamine concentration is from 20 to 40%.

17. The wash liquid as claimed in claim 10, wherein the activator concentration is from 5 to 40% by weight.

18. The wash liquid as claimed in claim 10, wherein the activator concentration is from 8 to 30% by weight.

* * * * *